UNITED STATES PATENT OFFICE.

EDGAR F. PRICE AND FREDERICK M. BECKET, OF NIAGARA FALLS, NEW YORK, ASSIGNORS, BY MESNE ASSIGNMENTS, TO CENTRAL TRUST COMPANY OF NEW YORK, TRUSTEE, A CORPORATION OF NEW YORK.

PROCESS OF REDUCING METALLIC OXIDS.

No. 891,565.          Specification of Letters Patent.          Patented June 23, 1908.

Application filed August 5, 1907. Serial No. 387,241.

To all whom it may concern:

Be it known that we, EDGAR F. PRICE, citizen of the United States, and FREDERICK M. BECKET, subject of the King of Great Britain, residing at Niagara Falls, in the county of Niagara and State of New York, have invented certain new and useful Improvements in Processes of Reducing Metallic Oxids, of which the following is a specification.

This invention is a process of reducing metallic oxids, oxid mixtures or oxygen-containing compounds, by reacting thereon simultaneously with base- and acid- forming reducing agents. The reducing agent may comprise two carbids, the non-carbon elements of which are capable of entering together into a slag of suitable composition; thus the reducing agent may consist of a mixture of carbids of silicon and calcium in such proportions that the silica and lime produced may unite to yield a silicate slag of suitable character. Or instead of two carbids, a base-forming reducing agent, such as calcium carbid, may be used in conjunction with an acid-forming reducing agent such as metallic silicon or an alloy containing the same. If desired carbon in the form of coke or otherwise may be used in conjunction with the carbids, or with the mixture of carbid or base-forming reducing agent and silicon.

The process is advantageously applied to the reduction of oxids or oxid mixtures containing the refractory metals chromium, tungsten, molybdenum, and vanadium. The proportions of the respective carbids in the reducing agent will depend to some extent upon the presence or absence of acid or basic slag-forming ingredients in the ore to be reduced, the reducing agent being compounded to yield in all cases a suitable slag. The process is applicable to the production of the refractory metals above mentioned or to alloys of these with iron, nickel or other metals, and presents particular advantages for the preparation of products low in carbon, for which purpose an electric furnace is employed. The process will be described by way of example by reference to the production of low-carbon ferro-chromium by reduction of chromite or chrome iron ore by means of calcium and silicon carbid but the invention is not restricted thereto.

The chrome iron ore in a suitable state of subdivision is commingled with a reducing agent containing carbid of calcium and carbid of silicon, and the mixture is then fused in a suitable electric furnace, usually provided with carbon or graphite electrodes and a hearth or lining of a refractory material other than carbon, such as chromite. The combined carbids may be used in proportion to unite with the oxygen of the reducible oxids of the ore, both the carbon and the non-carbon elements of the carbids entering into the reaction. For instance one specific equation representing the process might be expressed as follows:

$$3FeOCr_2O_3 + 2CaC_2 + 2SiC = Fe_3Cr_6 + 2CaSiO_3 + 6CO$$

Many commercial chromites contain both alumina and magnesia, and in such case the proportion of calcium carbid in the reducing agent would usually be lessened, the object in all cases being to secure economical working conditions by the provision of a slag of suitable composition. In the case of siliceous ores, a small proportion of silicon carbid would usually be required. As will be obvious, the character of the slag may be controlled not only by varying the composition of the reducing agent, but also in the usual manner by the addition of a suitable proportion of a basic or acid flux as may be required. Other carbids of base- or acid-forming elements might of course be substituted for those of calcium and silicon should this be desirable. In the case of siliceous ores, both constituent carbids of the reducing agent may be of base-forming elements, as for instance carbids of calcium and aluminum; in such case the lime and alumina resulting from the reduction will unite with the silica of the ore to produce a fusible silicate slag.

For the production of iron or nickel alloys having any desired content of chromium or other refractory metal, iron or nickel or compounds of these metals may be incorporated with the mixture to be reduced or added to the bath. The process is preferably rendered continuous by adding fresh portions of the charge as required and withdrawing the products from time to time.

The word "silicon" as employed in certain of the claims is intended to cover generically the use of this element in a reacting state, whether uncombined or combined, it being essential merely that it should exist in a form capable of reducing metallic oxids.

We claim:

1. The process of reducing metallic oxids which consists in smelting a charge containing a metallic oxid and a plurality of carbids.

2. The process of reducing metallic oxids which consists in smelting a charge containing a metallic oxid and carbids of base- and acid- forming elements.

3. The process of reducing metallic oxids which consists in smelting a charge containing a metallic oxid and carbids of base- and acid- forming elements in proportion to yield a suitable slag.

4. The process of reducing oxid ores which consists in smelting a charge containing an oxid ore and carbids of base- and acid- forming elements in proportion to yield a suitable slag with the slag-forming constituents of the ore.

5. The process of reducing metallic oxids which consists in reacting thereon simultaneously with calcium carbid and silicon carbid.

6. The process of reducing metallic oxids which consists in reacting thereon simultaneously with calcium carbid and silicon carbid in proportion to yield a suitable slag.

7. The process of reducing metallic oxids which consists in reacting thereon simultaneously with calcium carbid and silicon carbid in proportion to yield a suitable slag with the slag-forming constituents of the ore.

8. The process of reducing metallic oxids which consists in mixing therewith a reducing agent comprising a plurality of carbids and smelting the mixture in an electric furnace.

9. The process of reducing metallic oxids which consists in mixing therewith a reducing agent comprising a plurality of carbids in substantially the proportion required for combining with the oxygen of the ore, and smelting the mixture in an electric furnace.

10. The process of reducing metallic oxids which consists in mixing therewith a reducing agent comprising carbids of calcium and silicon, and smelting the mixture in an electric furnace.

11. The process of reducing metallic oxids which consists in mixing therewith a reducing agent comprising carbids of calcium and silicon in substantially the proportion required for combining with the oxygen of the ore; and smelting the mixture in an electric furnace.

12. The process of reducing metallic oxids which consists in mixing therewith a reducing agent comprising carbids of calcium and silicon in the relative proportion required to yield a suitable slag, and smelting the mixture in an electric furnace.

13. The process of producing ferro-chromium which consists in reacting on chromite in an electric furnace with carbids of calcium and silicon.

14. The process of producing ferro-chromium which consists in reacting on chromite in an electric furnace with carbids of calcium and silicon in proportion to yield a suitable slag.

15. The process of reducing metallic oxids which consists in reacting thereon with a mixture of a base-forming carbid and a material containing unoxidized silicon.

16. The process of reducing metallic oxids which consists in reacting thereon simultaneously with calcium carbid and a material containing unoxidized silicon.

17. The process of reducing metallic oxids which consists in reacting thereon simultaneously with carbon and with base-forming and acid-forming reducing agents.

In testimony whereof, we affix our signatures in presence of two witnesses.

EDGAR F. PRICE.
FREDERICK M. BECKET.

Witnesses:
C. C. Mosher,
J. N. Deinhardt.